US011029483B2

(12) United States Patent
Nakamura

(10) Patent No.: US 11,029,483 B2
(45) Date of Patent: Jun. 8, 2021

(54) LENS APPARATUS AND IMAGE PICKUP APPARATUS

(71) Applicant: CANON KABUSHIKI KAISHA, Tokyo (JP)

(72) Inventor: Tomoyuki Nakamura, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/363,478

(22) Filed: Mar. 25, 2019

(65) Prior Publication Data

US 2019/0302399 A1    Oct. 3, 2019

(30) Foreign Application Priority Data

Mar. 30, 2018   (JP) .............................. JP2018-069505

(51) Int. Cl.
*H04N 5/232*       (2006.01)
*G02B 27/64*       (2006.01)
(Continued)

(52) U.S. Cl.
CPC ................ *G02B 7/09* (2013.01); *G02B 7/10* (2013.01); *G02B 7/102* (2013.01); *G02B 7/28* (2013.01);
(Continued)

(58) Field of Classification Search
None
See application file for complete search history.

(56) References Cited

U.S. PATENT DOCUMENTS 6,219,098 B1 * 4/2001 Kawamura ........ H04N 5/23212
                                                    348/240.3
9,264,638 B2    2/2016 Nakamura et al.
(Continued)

FOREIGN PATENT DOCUMENTS

JP          S581401 B2     1/1983
JP         H110186209      7/1998
(Continued)

OTHER PUBLICATIONS

Photographic Science and Technology Forum: Digital Photography Review, "Matching Bokeh Between Lenses of Different Focal Length?" Jan. 12, 2016.
(Continued)

*Primary Examiner* — Mark T Monk
(74) *Attorney, Agent, or Firm* — Carter, DeLuca & Farrell LLP

(57) ABSTRACT

Provided is a lens apparatus including: a first lens unit arranged closest to an object side and configured not to move for zooming; a zoom lens unit configured to move for zooming; an aperture stop; and an imaging lens unit arranged closest to an image side. The first lens unit includes a first focus lens unit configured to move for focusing. The imaging lens unit includes a second focus lens unit configured to move for focusing and to move for macro image pickup. The lens apparatus further includes a controller configured to control a position of the second focus lens unit for the macro image pickup based on a state of at least one of the first focus lens unit, the zoom lens unit, and the aperture stop.

14 Claims, 8 Drawing Sheets

(51) Int. Cl.
    *G02B 7/10*  (2021.01)
    *G02B 7/09*  (2021.01)
    *G02B 7/28*  (2021.01)
    *G03B 13/36* (2021.01)
    *G02B 15/16* (2006.01)

(52) U.S. Cl.
    CPC .......... *G02B 15/16* (2013.01); *G02B 27/646* (2013.01); *G03B 13/36* (2013.01); *H04N 5/23212* (2013.01)

(56) References Cited

U.S. PATENT DOCUMENTS

| | | |
|---|---|---|
| 9,268,120 B2 | 2/2016 | Shimomura et al. |
| 9,310,592 B2 | 4/2016 | Wakazono et al. |
| 9,678,318 B2 | 6/2017 | Nakamura et al. |
| 9,904,043 B2 | 2/2018 | Shimomura et al. |
| 2017/0108678 A1 | 4/2017 | Miyazawa et al. |
| 2017/0269374 A1 | 9/2017 | Takemoto et al. |

FOREIGN PATENT DOCUMENTS

| | | | |
|---|---|---|---|
| JP | 2002107608 A | | 4/2002 |
| JP | 2003156672 A | * | 5/2003 |
| JP | 2003156672 A | | 5/2003 |
| JP | 3844019 B2 | | 11/2006 |

OTHER PUBLICATIONS

Partial European Search Report issued by the European Patent Office dated Aug. 26, 2019 in corresponding European Patent Application No. 19166057.0.

"Matching Bokeh Between Lenses of Different Focal Length?" Photographic Science and Technology Forum: Digital Photography Review, Jan. 12, 2016, retrieved Aug. 2, 2019, www.dpreview.com/forums/thread/3949973, pp. 1-15.

Extended European Search Report issued by the European Patent Office dated Jan. 27, 2020 in corresponding European Patent Application No. 19166057.0.

* cited by examiner

LENS APPARATUS AND IMAGE PICKUP APPARATUS

BACKGROUND OF THE INVENTION

Field of the Invention

The present invention relates to a lens apparatus and an image pickup apparatus.

Description of the Related Art

For image pickup apparatus including a broadcasting television camera, a movie camera, a video camera, a digital still camera, a monitoring camera, and a silver halide film camera, there is known a zoom lens configured to perform focusing and zooming by moving various lens units along an optical axis.

There is known a zoom lens including, in order from an object side to an image side: a focus lens unit, which is stationary for zooming, and is configured to perform focusing by being moved partially or entirely; a zoom lens unit formed of a magnification varying system and a compensation system; and an imaging lens unit for imaging. The zoom lens has the focus lens unit arranged closest to the object side, and hence a position of the focus lens unit corresponding to an object distance is determined irrespective of a zooming state. Thus, focus control corresponding to the zooming state is not required.

There is also known a zoom lens configured to move a zoom lens unit by rotation of a cam in order to enable high-speed manual zooming.

The focus lens unit arranged closest to the object side and the zoom lens unit to be moved by a cam mechanism are both suitable for a manual operation. A zoom lens of a manual operation type is preferred by professionals due to its high operability, but it is difficult to correct a deviation of a focus position due to a manufacturing error.

There is known a method of correcting a deviation of a focus position due to a manufacturing error (performing a focus adjustment) by partially or entirely moving the imaging lens unit (Japanese Patent Application Laid-Open No. H10-186209). In addition, there is known a zoom lens configured to perform macro image pickup by partially or entirely moving the imaging lens unit (Japanese Patent Publication No. S58-1401).

The correction of the deviation of the focus position performed in Japanese Patent Application Laid-Open No. H10-186209 involves moving the imaging lens unit partially, and the macro image pickup performed in Japanese Patent Publication No. S58-1401 involves moving the imaging lens unit partially or entirely. The imaging lens unit can have a large number of functions by including an image stabilization lens unit and an extender lens unit. In such a case, it is desired to perform the above-mentioned focus adjustment and the above-mentioned macro image pickup by the movement of the same lens unit. However, when the same lens unit for those two functions is subjected to their respective control operations, it may be difficult to obtain a picture that does not have a sense of discomfort in both of those two functions.

SUMMARY OF THE INVENTION

This disclosure provides, for example, a lens apparatus advantageous in focus adjustment and macro image pickup by movement of a lens unit common therefore.

According to one embodiment of the present invention, there is provided a lens apparatus including: a first lens unit arranged closest to an object side and configured not to move for zooming; a zoom lens unit configured to move for zooming; an aperture stop; and an imaging lens unit arranged closest to an image side, wherein the first lens unit includes a first focus lens unit configured to move for focusing, wherein the imaging lens unit includes a second focus lens unit configured to move for focusing and to move for macro image pickup, and wherein the lens apparatus includes a controller configured to control a position of the second focus lens unit for the macro image pickup based on a state of at least one of the first focus lens unit, the zoom lens unit, and the aperture stop.

Further features of the present invention will become apparent from the following description of exemplary embodiments with reference to the attached drawings.

DESCRIPTION OF THE EMBODIMENTS

Now, embodiments of the present invention are described in detail with reference to the accompanying drawings.

A zoom lens in one embodiment of the present invention includes a first lens unit arranged closest to an object side, which is stationary for zooming, a zoom lens unit formed of magnification varying system lenses and adjustment system lenses, an aperture stop, and an imaging lens unit arranged closest to an image side. The first lens unit includes a first focus lens unit configured to perform a focus adjustment by being moved partially or entirely, and the imaging lens unit includes a second focus lens unit configured to perform a focus adjustment by being moved partially or entirely.

The zoom lens includes a macro operating unit (operating unit) configured to perform macro image pickup, and has a correction table for at least any one of focus deviations caused by changes in respective optical parameters of a zoom, a focus, and an aperture stop.

Against the change in each of the optical parameters, the focus adjustment is performed by position control of the second focus lens unit based on the correction table, and the second focus lens unit is moved by an operation of the macro operating unit at a time of macro image pickup.

Next, configurations and control flows of the respective embodiments are described. In the following description, like components are denoted by like reference symbols.

First Embodiment

Figure 1:
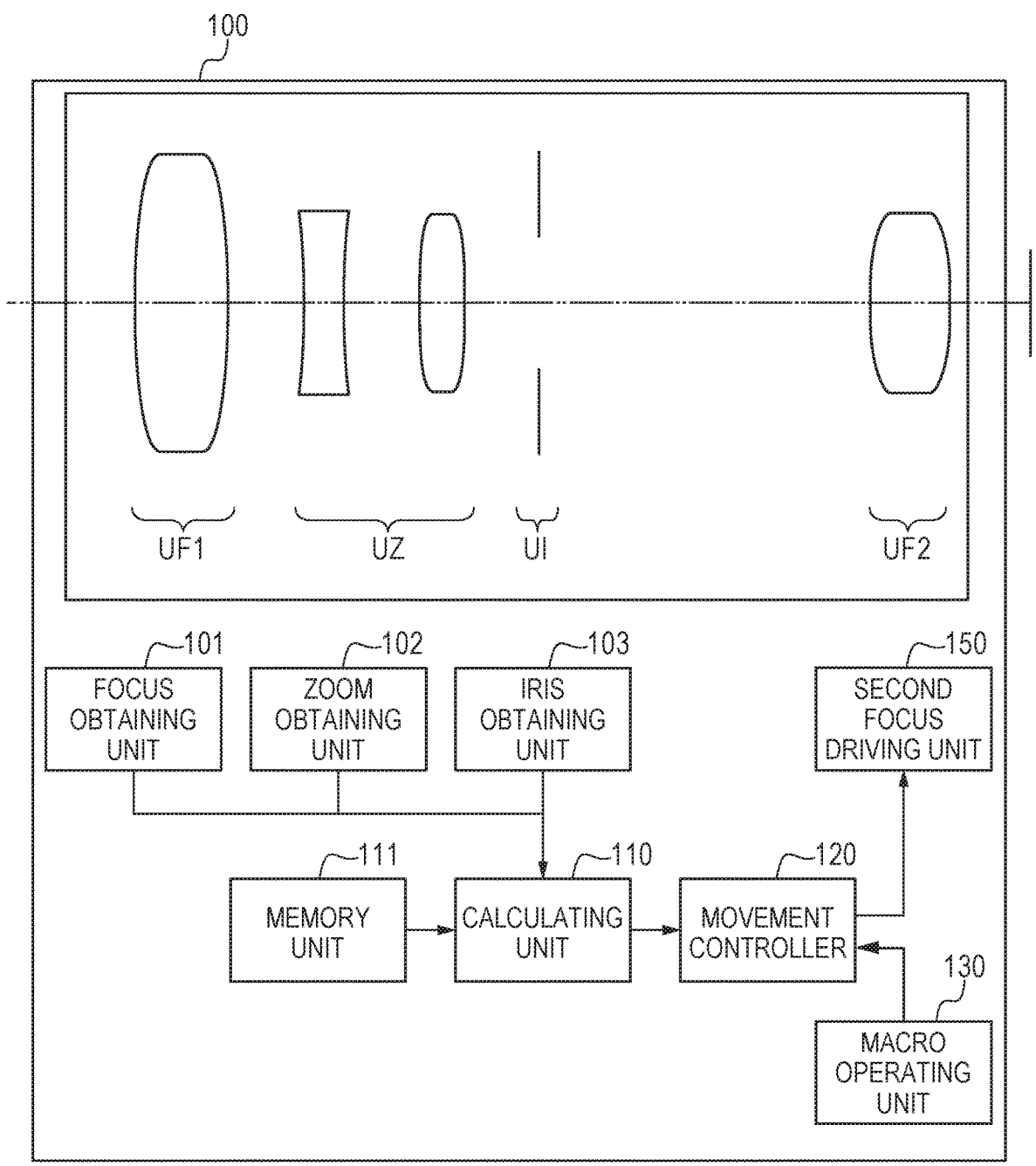
FIG. 1 is a schematic diagram of a main portion of a first embodiment of the present invention.

FIG. 1 is a configuration diagram of a main portion of a zoom lens relating to a first embodiment of the present invention. A zoom lens 100 has a lens section including a focus part UF, a zoom part UZ, and an aperture stop UI. The zoom lens 100 includes a focus obtaining unit 101 configured to obtain a position of a focus lens, a zoom obtaining unit 102 configured to obtain a position of a zoom lens, and an iris obtaining unit 103 configured to obtain a position (state) of an aperture stop. The obtaining units 101 to 103 are each formed of an encoder, a potentiometer, a photosensor, or other such detector.

A calculation unit 110 is a calculation circuit (CPU) (correction unit) configured to perform different kinds of control on the zoom lens. A movement controller 120 is a controller configured to control driving of the second focus lens unit, and a second focus driving unit 150 is a driving unit configured to drive the second focus lens unit. A macro operating unit 130 is an operating unit configured to operate the driving of the second focus lens unit at times of macro image pickup and bokeh image pickup (bokeh imaging, blur image pickup, blur imaging). A memory unit 111 stores a correction table relating to a movement amount of the second focus lens unit, which is required for correcting a focus deviation caused by a change in each of the optical parameters of a focus, a zoom, and an aperture stop.

In the first embodiment, a movement amount f2 of a second focus movable lens unit in a macro operation is determined based on Expression (1), where "m" represents a movement amount to be used by the macro operating unit, and "mp" represents a movement amount required for completely correcting the focus deviation caused by the change in each of the optical parameters of the zoom, the focus, and the aperture stop.

$$f2 = m + mp1 \qquad (1)$$

In this case, an actual movement amount mp1 satisfies Conditional Expression (2).

$$0.5 < mp1/mp < 1.5 \qquad (2)$$

With Expression (1), the movement required for correcting the focus deviation caused by the change in each of the optical parameters is performed when there is a change in each of the optical parameters even during the macro image pickup.

It is more preferred that Conditional Expression (2) be Conditional Expression (2a).

$$0.8 < mp1/mp < 1.2 \qquad (2a)$$

It is further more preferred that Conditional Expression (2) be Conditional Expression (2b).

$$mp1/mp = 1.0 \qquad (2b)$$

In one embodiment of the present invention, it is ideal to correct the movement amount "m" to be used by the macro operating unit by the movement amount "mp" required for correcting the focus deviation caused by the change in each of the optical parameters of the zoom, the focus, and the aperture stop. However, even by correcting the movement amount "m" to be used by the macro operating unit by 80% or 50% of a movement amount "p" required for correcting the focus deviation caused by the change in each of the optical parameters of the zoom, the focus, and the aperture stop, it is possible to fully enjoy the effects of the present invention.

Next, the control flow of the first embodiment is described.

Figure 2:
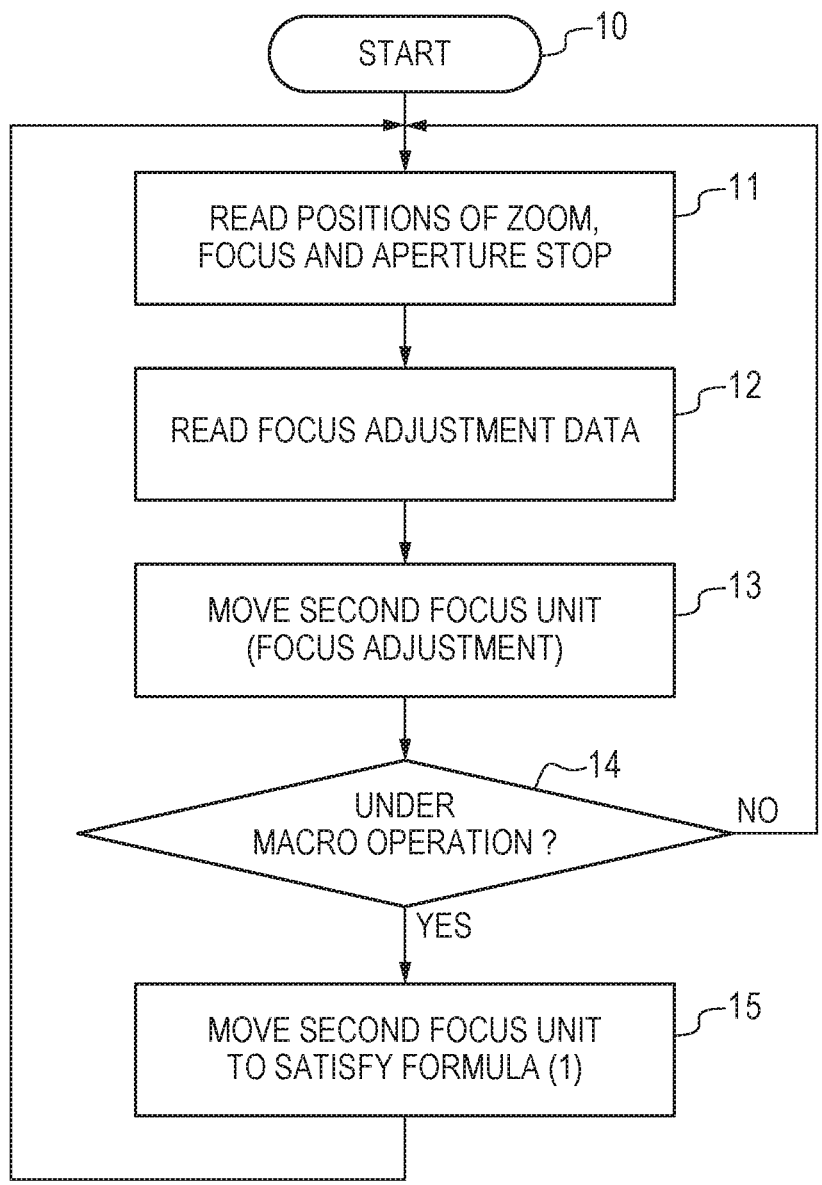
FIG. 2 is a flow chart for illustrating control in the first embodiment.

FIG. 2 is a flow chart relating to driving of the second focus movable lens unit of the zoom lens in the first embodiment. Processing is started from Step 10.

First, the calculation unit 110 obtains different kinds of optical parameters including positions and states of the focus, the zoom, and the aperture stop from the focus obtaining unit 101, the zoom obtaining unit 102, and the iris obtaining unit 103, respectively (Step 11).

Subsequently, the calculation unit 110 reads a correction amount corresponding to each kind of optical parameter, which relates to the driving of the second focus movable lens unit, from the correction table stored in the memory unit 111 (Step 12). At this time, data on discrete values are stored in the correction table. Therefore, the neighbor value nearest to each kind of optical parameter within the table may be employed as it is, or an interpolation value may be employed by being obtained by interpolation processing as appropriate from values near the neighbor value.

Subsequently, the calculation unit 110 outputs the movement amount of the second focus lens unit corresponding to the correction amount to the movement controller 120. The second focus driving unit 150 drives the second focus lens unit to move along an optical axis, to thereby perform a focus adjustment (Step 13).

Subsequently, the movement controller 120 reads a signal of the macro operating unit 130 (Step 14).

When the zoom lens is under the macro operation, the second focus lens unit is moved so as to satisfy Expression (1) and Conditional Expression (2) (Step 15):

$$f2 = m + mp1 \qquad (1),$$

where:

$$0.5 < mp1/mp < 1.5 \qquad (2).$$

The procedure returns to Step 11 to continue the flow.

The driving of the second focus lens unit is controlled in the above-mentioned manner, to thereby be able to start normal image pickup smoothly without going out of focus when recovering from macro image pickup to normal image pickup even in a case where each of the optical parameters of the zoom, the focus, and the aperture stop has changed since before macro start.

Second Embodiment

In a second embodiment of the present invention, the second focus movable lens unit is stopped when the macro operation is performed.

With this configuration, even when there is a change in each of the optical parameters of the zoom lens at the time of the macro operation, the movement required for correcting the focus deviation caused by the change in each of the optical parameters is not performed. In a case of performing the macro image pickup or intentional bokeh image pickup, movement for a focus adjustment performed under the macro operation may cause a focus lens to be moved in a manner different from the intention of a photographer, which may give the photographer a sense of discomfort. Therefore, by avoiding receiving any instructions for the driving of the second focus movable lens unit from units other than the macro operating unit at the time of the macro operation, it is possible to perform the focus control that does not give the photographer a sense of discomfort during the macro operation and the macro image pickup.

It is preferred that, when a shift is made from the macro image pickup to the normal image pickup, the second focus lens unit return to the position at the start of the macro operation, and perform the focus adjustment for the change in each of the optical parameters. With this configuration, the movement of the second focus lens unit can be clearly distinguished between the movement involved in the macro image pickup and the movement involved in the focus adjustment with ease, and the focus adjustment for the change in each of the optical parameters can be controlled more easily.

Third Embodiment

Figure 3:
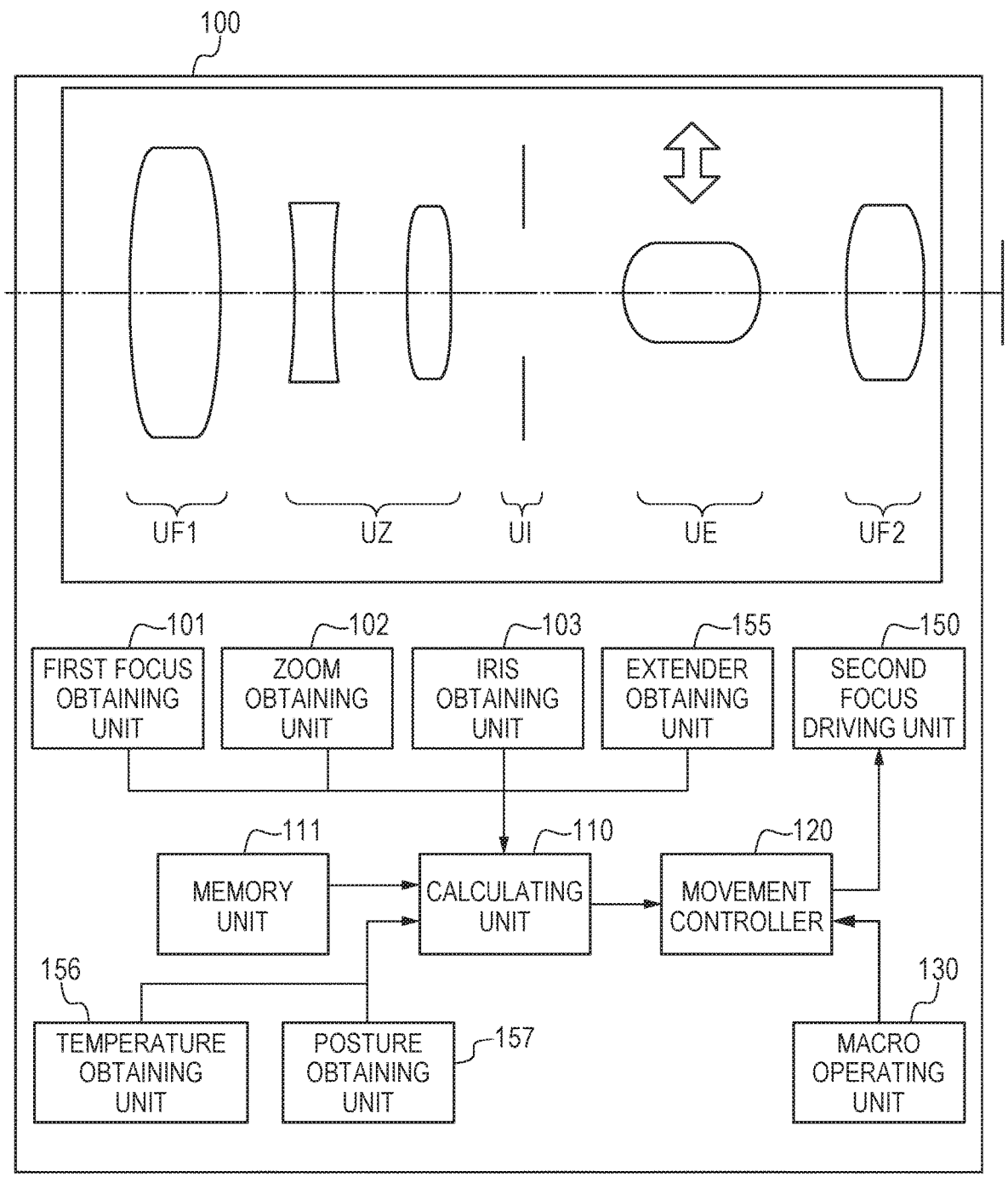
FIG. 3 is a schematic diagram of a main portion of a third embodiment of the present invention.

FIG. 3 is a configuration diagram of a main portion of a zoom lens relating to a third embodiment of the present invention. Unlike the zoom lens in the first embodiment, the zoom lens in the third embodiment includes an extender part UE capable of being inserted into and removed from the lens section of the zoom lens 100 and an extender obtaining unit 155 for insertion and removal of an extender. The zoom lens in the third embodiment further includes a temperature obtaining unit (temperature detector) 156 configured to detect a temperature change and a posture obtaining unit 157 configured to detect a posture (posture difference) of arrangement of a zoom lens with respect to a gravity direction.

It is further preferred that the zoom lens include an extender lens unit, which is capable of being inserted into and removed from an optical path, and is configured to shift a focal length, include at least one temperature detection unit, and include at least one detection unit for detecting a posture of the zoom lens. The zoom lens may include a correction table for correcting an influence exerted on the focus deviation by each of the optical parameters including the state of the insertion or removal of the extender lens unit into/from the optical path, its temperature, and its posture, to thereby move the second focus movable lens unit based on the correction table depending on the change in each of the optical parameters.

It is also preferred to shift from the macro image pickup to the normal image pickup to start the focus adjustment when the second focus movable lens unit passes through a position appropriate for the focus adjustment with each of the currently-set optical parameters. That is, it is also preferred that the second focus movable lens unit recover from the state of the macro image pickup to reach the position at which the focus adjustment has been performed in the normal image pickup, to thereby start the normal image pickup from the position at which the focus adjustment has been performed without starting the focus adjustment after a focus adjustment amount returns to a zero state at a normal image pickup position. With this configuration, even when there is a change in each of the optical parameters of the zoom lens during the macro image pickup, it is possible to switch from the macro image pickup to the normal image pickup smoothly without going out of focus at a time of the recovery to the normal image pickup.

Next, the control flow of the third embodiment is described.

Figure 4:
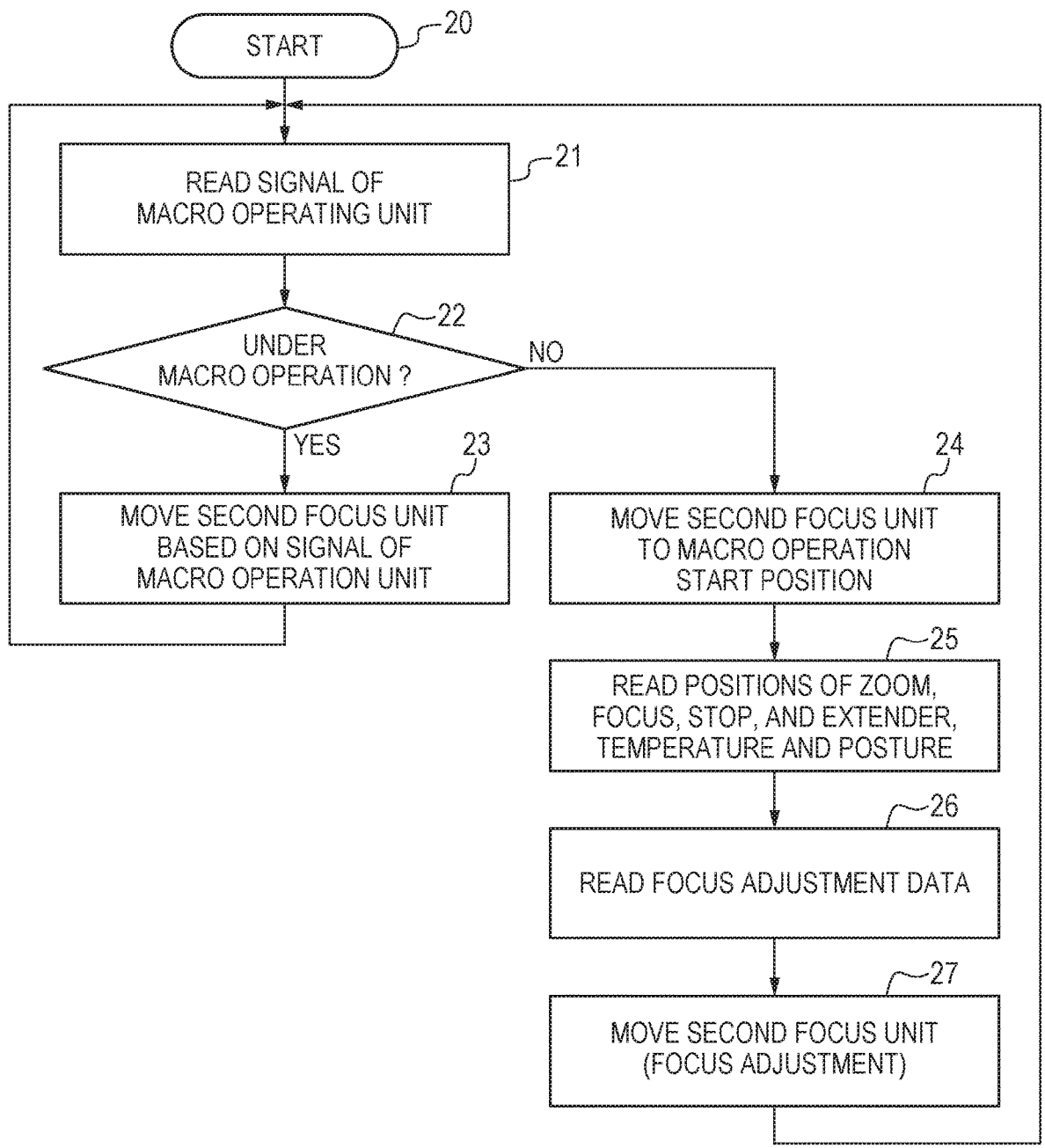
FIG. 4 is a flow chart for illustrating control in the third embodiment.

FIG. 4 is a flow chart relating to the third embodiment. Processing is started from Step 20.

First, the movement controller 120 reads the signal of the macro operating unit from the macro operating unit 130 (Step 21).

Subsequently, when the zoom lens is under the macro operation, the movement controller 120 drives the second focus driving unit 150 based on the signal of the macro operating unit to move the second focus lens unit along the optical axis, to thereby perform the macro image pickup or the bokeh image pickup (Step 22 and Step 23). Then, the procedure returns to Step 21 to continue the flow.

Meanwhile, when the zoom lens is not under the macro operation in Step 22 or after the macro operation is finished, in a case where the second focus lens unit has moved from the position before the start of the macro operation, the movement controller 120 moves the second focus lens unit to a start position (Step 24).

Subsequently, the respective obtaining units 101 to 103 and 155 read the optical parameters of the focus, the zoom, the aperture stop, and the extender lens unit, respectively. In addition, the respective obtaining units 156 and 157 read the optical parameters of the temperature and the posture difference of the zoom lens, respectively, and output the obtained information to the calculation unit 110 (Step 25). At this time, a temperature detection apparatus may use a plurality of apparatus in combination to perform an adjustment suitable for an image pickup environment by, for example, handling a heat source from one direction or detecting whether the temperature is steady or transitional even in a case of the same temperature. With regard to the posture difference, a plurality of detection apparatus may be used as well to improve accuracy.

Subsequently, the calculation unit 110 reads the correction amount corresponding to each kind of optical parameter from the correction table stored in the memory unit 111 (Step 26).

Subsequently, the calculation unit 110 transmits the movement amount of the second focus lens unit corresponding to the correction amount to the movement controller 120, and causes the movement controller 120 to drive the second focus driving unit 150 to move the second focus lens unit along the optical axis, to thereby perform the focus adjustment (Step 27).

The procedure returns to Step 21 to continue the flow.

By configuring the zoom lens in this manner, it is possible to perform focus adjustments in consideration of influences of changes of the state of the insertion and removal of the extender lens unit into/from the optical path, the temperature during image pickup, and the posture difference during image pickup.

Fourth Embodiment

Figure 5:
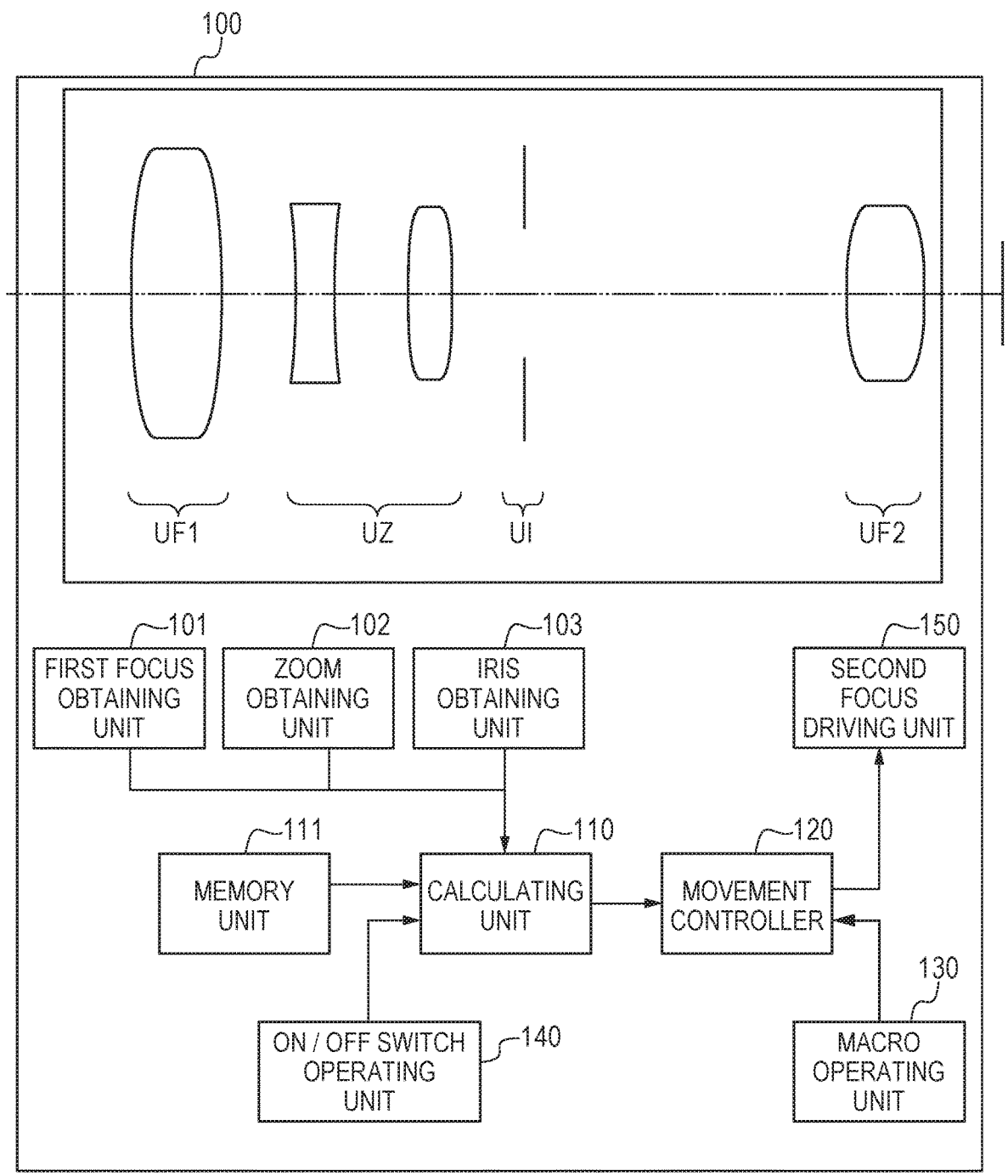
FIG. 5 is a schematic diagram of a main portion of a fourth embodiment of the present invention.

FIG. 5 is a configuration diagram of a main portion of a zoom lens relating to a fourth embodiment of the present invention. Unlike the zoom lens in the first embodiment, the zoom lens in the fourth embodiment includes an ON/OFF switch operating unit 140 configured to switch between on and off of the focus adjustment for the change in each of the optical parameters.

In the fourth embodiment, the movement amount f2 of the second focus movable lens unit in the macro operation is determined based on Expression (3), where "m" represents an amount of movement from the normal image pickup position to a macro image pickup position to be performed by the macro operating unit, and "mf" represents a movement amount based on correction of a change of an f-number caused by a change in each of the optical parameters of the zoom, the focus, and the aperture stop.

$$f2=m+mf \qquad (3)$$

In this case, a movement amount p2 based on the correction amount of the change of the f-number caused by the change in each of the optical parameters of the aperture stop is determined in the following manner.

Assuming that an f-number exhibited before there is a change in each of the optical parameters of the zoom, the focus, and the aperture stop at the time of the macro operation is represented by Fno0, and an f-number exhibited after there is a change in each of the optical parameters is represented by Fno1, a change rate ΔFno of the f-number based on the change in each of the optical parameters of the zoom, the focus, and the aperture stop at the time of the macro operation is expressed as follows.

$$\Delta Fno = Fno1/Fno0 \quad (4)$$

In order to avoid changing bokeh quality ascribable to the change of the f-number based on the change in each of the optical parameters of the zoom, the focus, and the aperture stop at the time of the macro operation, the focal length may be changed so as to maintain a bokeh diameter (blur diameter) expressed by:

$$(bokeh\ diameter) = (focal\ length)/(f\text{-number}) \quad (5)$$

at a fixed level.

That is, by changing the focal length so as to satisfy:

$$(change\ rate\ of\ focal\ length)/(change\ rate\ of\ f\text{-number}) = 1 \quad (6),$$

it is possible to maintain the bokeh quality even when the f-number changes due to the change in each of the optical parameters of the zoom, the focus, and the aperture stop at the time of the macro operation. The change rate Δf2 of the movement amount of the second focus movable lens unit caused by the change in optical parameter, which corresponds to the change rate of the focal length, is expressed by Expression (7), where "m" represents the amount of the movement of the second focus lens unit from the normal image pickup position to the macro image pickup position to be performed by the macro operating unit 130, and "mf" represents the movement amount based on the correction of the change of the f-number caused by the change in each of the optical parameters of the zoom, the focus, and the aperture stop.

$$\Delta f2 = (m+mf)/m \quad (7)$$

The movement amount "mf" for compensating an influence of the change of the f-number caused by the change in each of the optical parameters on the bokeh diameter is determined so as to satisfy Conditional Expression (8).

$$0.5 < \Delta f2/\Delta Fno < 1.5 \quad (8)$$

That is, the movement amount "mf" is determined so as to satisfy the following conditional expression:

$$0.5 < \{(m+mf)/m\}/\Delta Fno < 1.5,$$

to thereby be able to produce the effects of the present invention. It is preferred that Conditional Expression (8) satisfy the following conditional expression.

$$0.8 < \Delta f2/\Delta Fno < 1.2 \quad (8a)$$

In this case, a more preferred effect can be produced. It is more preferred that the second focus lens unit be driven so that Conditional Expression (8a) satisfies the following conditional expression.

$$\Delta f2/\Delta Fno = 1 \quad (8b)$$

In this case, a still more preferred effect can be produced.

Conditional Expression (2) defines a relationship between the f-number and the movement amount of the second focus movable lens unit. By satisfying Conditional Expression (2), it is possible to maintain the bokeh diameter at a substantially fixed level when out-of-focus image pickup is intentionally performed.

It is also preferred to recover from the macro image pickup to the normal image pickup to start the focus adjustment when the second focus movable lens unit passes through the position appropriate for the focus adjustment with each of the currently-set optical parameters. That is, it is also preferred that the second focus movable lens unit recover from the state of the macro image pickup to reach the position at which the focus adjustment has been performed in the normal image pickup, to thereby start the normal image pickup from the position at which the focus adjustment has been performed without starting the focus adjustment after the focus adjustment amount returns to the zero state at the normal image pickup position. With this configuration, even when there is a change in each of the optical parameters of the zoom lens during the macro image pickup, it is possible to switch from the macro image pickup to the normal image pickup smoothly without going out of focus at the time of the recovery to the normal image pickup.

It is further preferred that a switching apparatus configured to turn on or off a focus adjustment be provided to the zoom lens, a zoom operating apparatus, or a focus operating apparatus to turn on or off the focus adjustment performed by moving the second focus movable lens unit. This can prevent an erroneous operation due to added noise and unintentional movement of the photographer.

Figure 6:
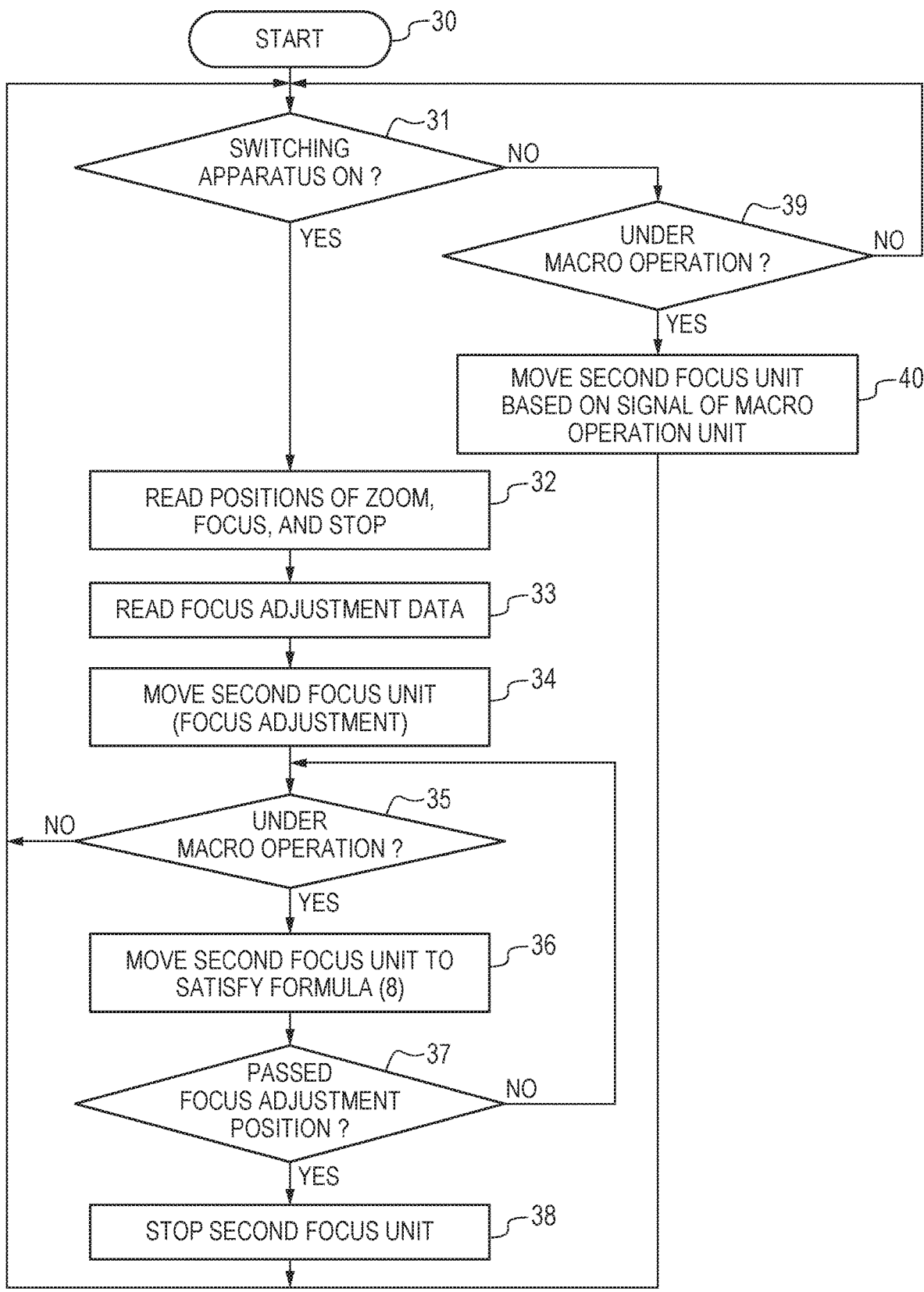
FIG. 6 is a flow chart for illustrating control in the fourth embodiment.

FIG. 6 is a flow chart relating to the fourth embodiment. Processing is started from Step 30.

First, the calculation unit 110 reads a signal of the ON/OFF switch operating unit 140, and determines whether or not to perform a focus adjustment (Step 31).

When the focus adjustment is performed, the respective obtaining units 101 to 103 read the optical parameters of the focus, the zoom, and the aperture stop, respectively, and transmit the read optical parameters to the calculation unit 110 (Step 32).

Subsequently, the calculation unit 110 reads the correction amount corresponding to each kind of optical parameter from the correction table stored in the memory unit 111 (Step 33).

Subsequently, the calculation unit 110 transmits the movement amount of the second focus lens unit corresponding to the correction amount to the movement controller 120, and causes the movement controller 120 to drive the second focus driving unit 150 to move the second focus lens unit along the optical axis, to thereby perform the focus adjustment (Step 34).

Subsequently, the movement controller 120 reads the signal of the macro operating unit 130 to determine whether or not the zoom lens is under the macro operation (Step 35).

When the zoom lens is under the macro operation, the movement controller 120 moves the second focus lens unit so as to satisfy the following expression (Step 36).

$$0.5 < \Delta f2/\Delta Fno < 1.5 \quad (8)$$

Meanwhile, when the zoom lens is not under the macro operation, the procedure returns to Step 31 to continue the flow.

Subsequently, the movement controller 120 determines whether or not the position of the second focus lens unit has passed through the position appropriate for the focus adjustment amount (Step 37). When the position of the second focus lens unit has passed through the position appropriate for the focus adjustment amount, the second focus driving unit 150 stops the driving to stop the movement of the second focus lens unit (Step 38). Then, the procedure returns to Step 31 to continue the flow. Meanwhile, when the position of the second focus lens unit has not passed through the position appropriate for the focus adjustment amount, the procedure returns to Step 35 to continue the flow.

When the focus adjustment is not performed in Step 31 and when the zoom lens is under the macro operation, the movement controller 120 drives the second focus driving unit 150 based on the signal of the macro operating unit to move the second focus lens unit along the optical axis, to thereby perform the macro image pickup or the bokeh image pickup (Step 37 and Step 38). Then, the procedure returns to Step 31 to continue the flow.

Meanwhile, when the zoom lens is not under the macro operation, the procedure returns to Step 31 to continue the flow.

With this configuration, even when there is a change in each of the optical parameters of the zoom lens during the macro image pickup, it is possible to switch from the macro image pickup to the normal image pickup smoothly without going out of focus at the time of the recovery to the normal image pickup. In addition, when out-of-focus image pickup is intentionally performed, it is possible to continue the bokeh image pickup intended by the photographer while maintaining the bokeh diameter at a substantially fixed level even during a switch between the macro image pickup and the normal image pickup.

Fifth Embodiment

Figure 7:
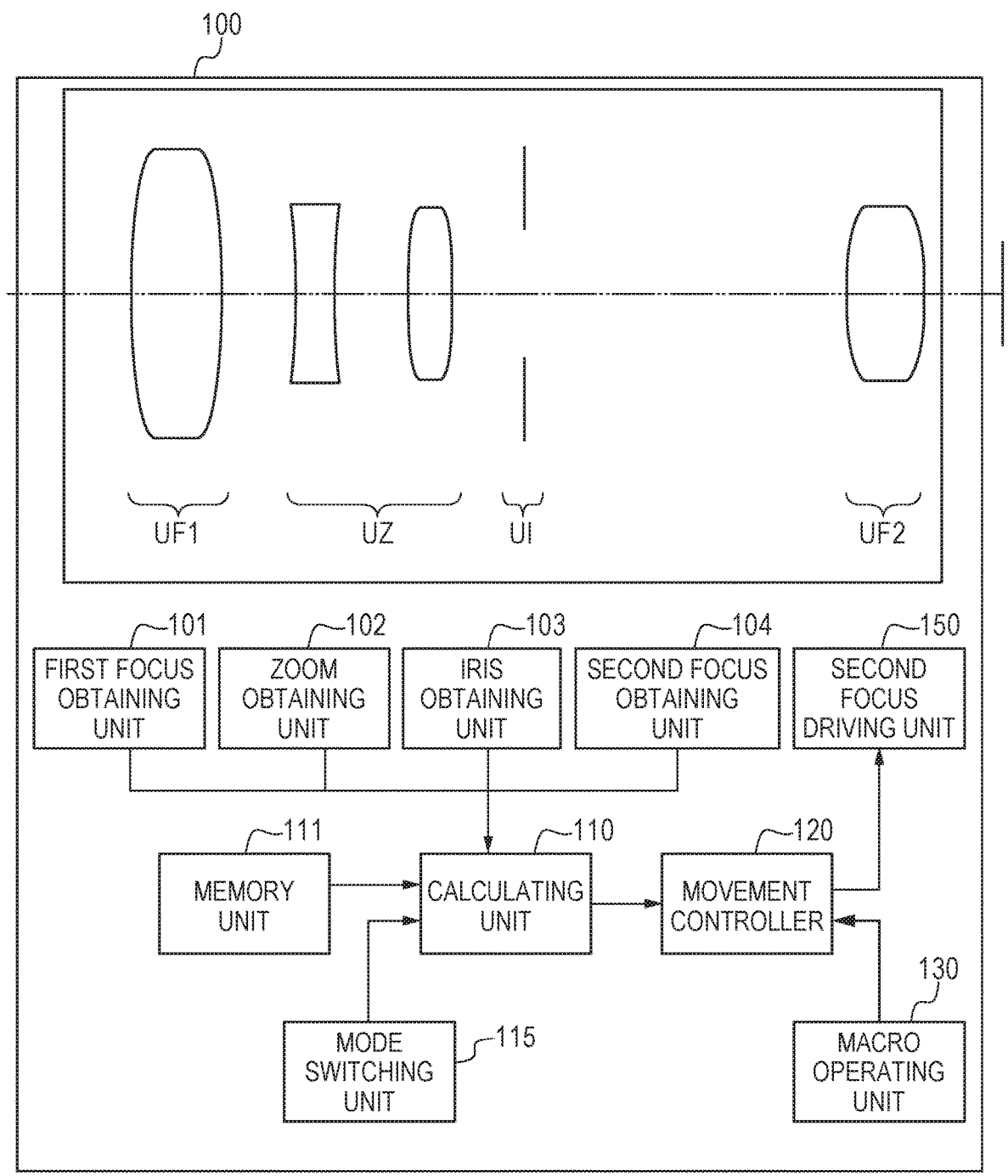
FIG. 7 is a schematic diagram of a main portion of a fifth embodiment of the present invention.

FIG. 7 is a configuration diagram of a main portion of a zoom lens relating to a fifth embodiment of the present invention. Unlike the zoom lens in the first embodiment, the zoom lens in the fifth embodiment includes a second focus obtaining unit 104 configured to obtain a position of a second focus part UF2 and a mode switching unit 115 configured to enable switching among different kinds of adjustment modes of the focus adjustment for the change in each of the optical parameters.

In the fifth embodiment, against the focus deviation caused by the change in each of the optical parameters of the zoom, the focus, and the aperture stop at the time of the macro operation, it is possible to switch among three adjustment modes to control the driving of the second focus movable lens unit. The zoom lens in the fifth embodiment includes a switching apparatus configured to switch among the adjustment modes.

In a first mode, the second focus movable lens unit is moved so as to satisfy Expression (1) in the first embodiment. That is, the movement amount f2 of the second focus movable lens unit in the macro operation is controlled so as to be a sum of the movement amount "m" to be used by the macro operating unit and the movement amount "p" involved in the focus adjustment for the change in each of the optical parameters. In a second mode, as in the second embodiment, when the macro operation is performed, the movement of the second focus movable lens unit, which is required for correcting the focus deviation caused by the change in each of the optical parameters, is not performed. In a third mode, the second focus movable lens unit is moved so as to satisfy Expression (8) in the fourth embodiment, which is described above.

This allows the photographer to select a more preferred adjustment mode suitable for an image pickup condition. That is, the first mode, which enables a smooth transition at the time of the switching between the normal image pickup and the macro image pickup, is suitable for an image pickup condition that involves frequent switching. The second mode, which avoids performing a focus adjustment during macro image pickup, is suitable for a case of continuing close-up image pickup, a case of performing bokeh image pickup, and other such case in which the image pickup condition is fixed to some extent. In the third mode, it is possible to maintain the bokeh diameter at a substantially fixed level when out-of-focus image pickup is intentionally performed, which enables the image pickup more suitable for the intention of the photographer.

Through setting of the respective components in the above-mentioned manner, each of the embodiments provides a zoom lens and an image pickup apparatus that are capable of appropriately controlling a focus adjustment and macro image pickup, to thereby be able to perform control that does not give the photographer a sense of discomfort.

Figure 8:
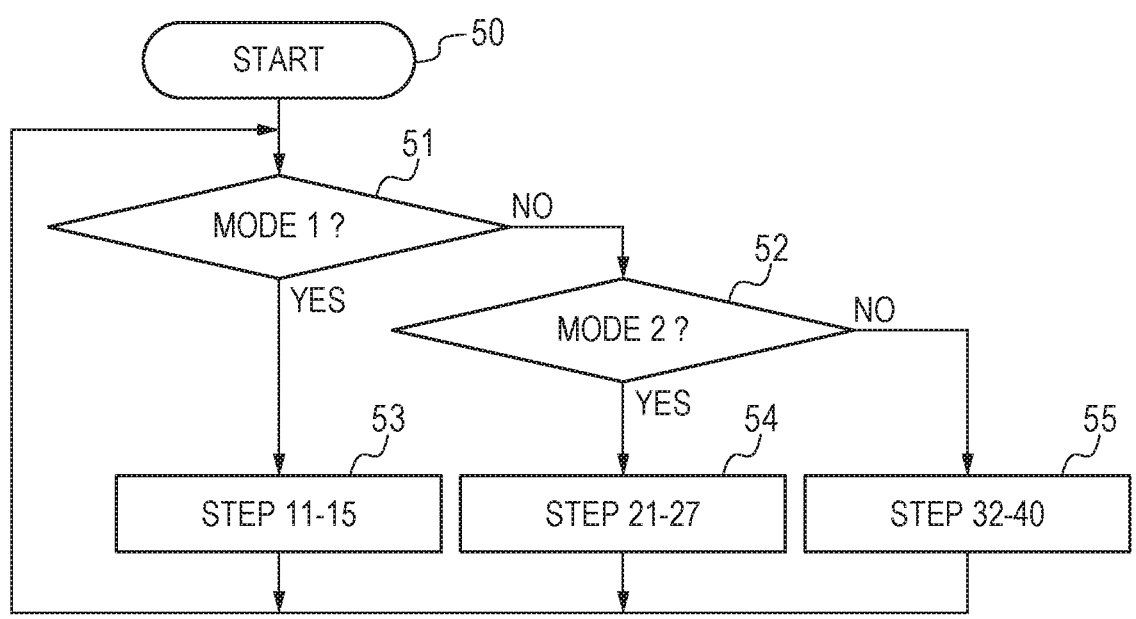
FIG. 8 is a flow chart for illustrating control in the fifth embodiment.

FIG. 8 is a flow chart relating to the fifth embodiment. Processing is started from Step 50.

First, the calculation unit 110 reads a signal of the mode switching unit 115 for switching among the adjustment modes, and determines the adjustment mode (Step 51 and Step 52).

Subsequently, when the adjustment mode is determined to be the first mode, the processing in the first embodiment from Step 11 to Step 15 illustrated in FIG. 2 is performed (Step 53). When the adjustment mode is determined to be the second mode, the processing in the second embodiment from Step 21 to Step 27 illustrated in FIG. 4 is performed (Step 54). Subsequently, when the adjustment mode is determined to be the third mode, the processing in the fourth embodiment from Step 32 to Step 38 illustrated in FIG. 6 is performed (Step 55).

In any one of the cases, the procedure returns to Step 51 to continue the flow.

It is also possible to configure an image pickup apparatus capable of enjoying the effects of the present invention by configuring an image pickup apparatus including a zoom lens in one embodiment of the present invention and a solid-state image pickup element arranged in an image plane of the zoom lens.

The exemplary embodiments of the present invention are described above, but needless to say, the present invention is not limited to those embodiments, and various modifications and changes can be made thereto without departing from the spirit of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-069505, filed Mar. 30, 2018, which is hereby incorporated by reference herein in its entirety.

What is claimed is:

1. A lens apparatus comprising:
a first lens unit arranged closest to an object side and configured not to move for zooming;
a zoom lens unit configured to move for zooming;
an aperture stop; and
an imaging lens unit arranged closest to an image side,
wherein the first lens unit includes a first focus lens unit configured to move for focusing,
wherein the imaging lens unit includes a second focus lens unit configured to move for correction of a focus deviation based on at least one of a position of the first focus lens unit, a position of the zoom lens unit, and an aperture size of the aperture stop, and to move for macro image pickup based on a command from an operating unit for the macro image pickup, and
wherein the lens apparatus comprises a controller configured to selectively perform:

a first control of causing the second focus lens unit to move for the correction with a movement amount of the second focus lens unit obtained by the controller based on the at least one of the position of the first focus lens unit, the position of the zoom lens unit, and the aperture size of the aperture stop; and a second control of causing the second focus lens unit to move for the macro image pickup with the movement amount obtained by the controller not based on the at least one of the position of the first focus lens unit, the position of the zoom lens unit, and the aperture size of the aperture stop, but based on the command.

2. The lens apparatus according to claim 1, wherein the controller is configured to perform change from the second control to the first control after returning the second focus lens unit to a position of the second focus lens unit at start of the second control.

3. The lens apparatus according to claim 1, wherein the controller is configured to perform change from the second control to the first control without returning the second focus lens unit to a position of the second focus lens unit at start of the second control.

4. The lens apparatus according to claim 1, wherein the controller is configured to perform the first control of causing the second focus lens unit to move for the correction with the movement amount obtained by the controller not based on the command.

5. The lens apparatus according to claim 1, wherein the controller is configured to perform the first control of causing the second focus lens unit to move for the correction and the macro image pickup with the movement amount obtained by the controller based on the at least one of the position of the first focus lens unit, the position of the zoom lens unit, and the aperture size of the aperture stop, and based on the command.

6. The lens apparatus according to claim 5, comprising a switching device for switching between the first control and the second control.

7. The lens apparatus according to claim 1, wherein the controller has information of a table for the correction with respect to the at least one of the position of the first focus lens unit, the position of the zoom lens unit, and the aperture size of the aperture stop.

8. The lens apparatus according to claim 5, wherein a conditional expression $$0.5 < (f2-m)/mp < 1.5$$

is satisfied where m represents a movement amount of the second focus lens unit corresponding to the command, mp represents a movement amount of the second focus lens unit for the correction, and f2 represents an actual movement amount of the second focus lens unit.

9. The lens apparatus according to claim 5, wherein the controller is configured to cause the second focus lens unit to move for the correction based on a change in an f-number associated with a change in the at least one of the position of the first focus lens unit, the position of the zoom lens unit, and the aperture size of the aperture stop.

10. The lens apparatus according to claim 9, wherein a conditional expression $$0.5 < \{(m+mf)/m\}/\Delta Fno < 1.5$$

is satisfied where m represents a movement amount of the second focus lens unit corresponding to the command, $\Delta Fno$ represents a change rate of the f-number, and mf represents a movement amount of the second focus lens unit based on the change rate, wherein $\Delta Fno$ is expressed by $$\Delta Fno = Fno1/Fno0$$

where Fno0 represents an f-number before change in the at least one of the position of the first focus lens unit, the position of the zoom lens unit, and the aperture size of the aperture stop at a time of the macro image pickup, and Fno1 represents an f-number after the change in the at least one of the position of the first focus lens unit, the position of the zoom lens unit, and the aperture size of the aperture stop at the time of the macro image pickup.

11. The lens apparatus according to claim 1, further comprising an extender lens unit configured to shift a focal length of the lens apparatus by insertion thereof into and removal thereof from an optical path in the lens apparatus, wherein the controller is configured to cause the second focus lens unit to move for the correction further based on which of the insertion or the removal.

12. The lens apparatus according to claim 1, further comprising a temperature detector configured to detect temperature, wherein the controller is configured to cause the second focus lens unit to move for the correction further based on the detected temperature.

13. The lens apparatus according to claim 1, further comprising a posture detector configured to detect a posture of the lens apparatus, wherein the controller is configured to cause the second focus lens unit to move for the correction further based on the detected posture.

14. An image pickup apparatus comprising:

a lens apparatus; and an image pickup element configured to pick up an image formed by the lens apparatus, wherein the lens apparatus comprises:

a first lens unit arranged closest to an object side and configured not to move for zooming;

a zoom lens unit configured to move for zooming;

an aperture stop; and an imaging lens unit arranged closest to an image side, wherein the first lens unit includes a first focus lens unit configured to move for focusing, wherein the imaging lens unit includes a second focus lens unit configured to move for correction of a focus deviation based on at least one of a position of the first focus lens unit, a position of the zoom lens unit, and an aperture size of the aperture stop, and to move for macro image pickup based on a command from an operating unit for the macro image pickup, and wherein the lens apparatus comprises a controller configured to selectively perform:

a first control of causing the second focus lens unit to move for the correction with a movement amount of the second focus lens unit obtained by the controller based on the at least one of the position of the first focus lens unit, the position of the zoom lens unit, and the aperture size of the aperture stop; and a second control of causing the second focus lens unit to move for the macro image pickup with the movement amount obtained by the controller not based on the at least one of the position of the first focus lens unit, the position of the zoom lens unit, and the aperture size of the aperture stop, but based on the command.

* * * * *